United States Patent [19]
Jones et al.

[11] Patent Number: 5,961,591
[45] Date of Patent: Oct. 5, 1999

[54] DOWNLOADING DATA WHILE REJECTION OF ITS USE MAY BE OVERRIDDEN

[75] Inventors: Gregory Alan Jones, Seatle; Satoshi Nakajima; Scott E. Berkun, both of Redmond; Christopher M. Franklin, Bellevue, all of Wash.

[73] Assignee: Microsoft Corporation, Redmond, Wash.

[21] Appl. No.: 08/855,093

[22] Filed: May 13, 1997

[51] Int. Cl.⁶ .................................................. G06F 15/16
[52] U.S. Cl. .......................... 709/217; 709/227; 713/202; 345/326
[58] Field of Search ......................... 395/200.47, 200.48, 395/200.49, 200.51, 186, 187.01, 188.01; 707/1, 501, 5, 9; 345/326, 333, 335

[56] References Cited

U.S. PATENT DOCUMENTS

| | | | |
|---|---|---|---|
| 5,678,041 | 10/1997 | Baker et al. | 707/9 |
| 5,706,507 | 1/1998 | Schloss | 707/104 |
| 5,833,212 | 11/1998 | Cragun et al. | 714/37 |
| 5,855,015 | 12/1998 | Shoham | 707/5 |
| 5,878,233 | 3/1999 | Schloss | 707/9 |

FOREIGN PATENT DOCUMENTS 362256079  11/1987  Japan .

OTHER PUBLICATIONS

Atwood "Going Beyond blocking", Digital Media, Apr. 8, 1996, v5 n11 p. 3(4).

Lecitt "Browser bout: s split decision", Information Week, Sep. 15, 1996 n597 p. 106(6).

Muneo "Filtering utilities" PC Magazine, Apr. 8, 1997 v16 n7 p. 235(5).

Berners–Lee, T., and D. Connolly, "Hypertext Markup Language—2.0," *rfc 1866.txt at ds 1.internec.net,* 1995, pp. 1–68.

Berners–Lee, T., et al., "Uniform Resource Locators (URL)," *rfc1738.txt at ds1.internic.net,* 1994, pp. 1–22.

Tim Krauskopf et al. PICS Label Distribution Label Syntax and Communication Protocols, Version 1.1, W3C Recommendation Oct. 31, 1996. [web page] Oct. 1996 *Http://www.w3org/TR/REC–PICS–labels* [Accessed Oct. 1, 1998].

Michael T. KcKeown. URL Monikers and ActiveX Hyperlinks. [web page] May 1996; *Http.//channels.microsoft.com/workshop/networking/moniker/moniker.asp* [Accessed Oct. 1, 1998].

*Primary Examiner*—Dung C. Dinh
*Attorney, Agent, or Firm*—Seed and Berry LLP

[57] ABSTRACT

A downloading facility for downloading data while rejection of its use may be overridden is provided. In a preferred embodiment, the downloading facility receives a request to retrieve and use an identified body of data. In response, the facility initiates the retrieval of the identified body of data. At a time during its retrieval, use of the identified body of data is automatically rejected. In response to this rejection, the facility provides a user interface for authorizing the use of the identified body of data. During the provision of this user interface, retrieval of the identified body of data proceeds. When the provided user interface is used to authorize the use of the identified body of data, the facility uses the retrieved identified body of data in accordance with the request.

40 Claims, 11 Drawing Sheets

DOWNLOADING DATA WHILE REJECTION OF ITS USE MAY BE OVERRIDDEN

TECHNICAL FIELD

The invention relates generally to the field of downloading data, and, more specifically, to the field of controlling the use of downloaded data.

BACKGROUND OF THE INVENTION

The world wide web ("the web") is a very large body of information maintained on thousands of computer systems connected by the Internet. The web is organized into millions of documents called web pages. A group of related web pages produced and maintained by the same person or organization is known as a "web site."

A user typically interacts with the web using an application program known as a web browser or web client executing on the user's computer system. Each web page may be independently accessed by providing a reference to the web page, called a "URL," or "uniform resource locator," to the web browser application. URLs are well known, and are discussed in detail in T. Berners-Lee, et al., *Uniform Resource Locators* (URL), RFC 1738, CERN, Xerox PARC, Univ. of Minn., December, 1994The web browser uses the URL to retrieve the contents of the web page via the Internet using a Hypertext Transfer Protocol (HTTP), then displays those contents in a window displayed by the web browser application. HTTP is well known, and is discussed in detail in R. Fielding et al., Hypertext Transfer Protocol—HTTP/1.1, RFC 2068, Univ. of Col., MIT Laboratory for Computer Science, Digital Equipment Corp., January 1997. Web page contents are generally expressed in Hypertext Markup Language (HTML), and can include data such as text, still images, and audio and video clips; programs executable on the client machine; and links to related web pages. HTML is well known, and is discussed in detail in T. Bernes-Lee, et al., Hypertext Markup Language—2.0, RFC, 1866, MIT Laboratory for Computer Science, November 1995. Because web page contents can be extensive and the bandwidth available to download them is often limited, some web pages require considerable amounts of time to download.

Because the web is decentralized and diverse, some web pages may contain content that is objectionable to some users. For example, some web pages contain depictions of nudity, violence, or sex that may be inappropriate for young users.

Some web pages may also contain executable computer program code ("code") that is unsafe to execute. For example, a web page may contain code that is maliciously destructive and erases or modifies data stored on the user's computer system when it is executed. A web page may further contain code that, while not maliciously destructive, was carelessly developed and contains serious bugs.

Given the availability of objectionable content and unsafe code via the web, an automatic yet overrideable approach to screening out objectionable content and unsafe code would have significant utility, especially if it did not further exacerbate long download times for desired content and code.

SUMMARY OF THE INVENTION

The invention is directed to an improved approach to downloading a web page or other data that has been automatically rejected from presentation or execution, but whose rejection may be either confirmed or overridden by the user. In accordance with the invention, a downloading software facility ("the facility") receives a request from a user to display a web page, which is typically identified by a URL. The facility then initiates downloading of the web page. While the web page is being downloaded, the facility obtains the rating of the web page. If the rating indicates that the web page should not be presented to the user, the facility prompts the user for authorization to present the web page despite its rating. This prompting is performed while the web page is being downloaded. If the user does not provide authorization, then the facility aborts the downloading. If the user does provide authorization, then the facility does not interrupt the downloading and presents the web page to the user. Because the facility continues to download the web page while prompting for authorization, the download is completed sooner than if the facility had suspended the downloading while prompting for authorization. The facility also does not present any portion of the web page until authorization is provided so that the web page is not presented to a unauthorized user.

The facility can obtaining the rating of the web page in various ways. First, the web page itself may contain the rating. Thus, as the web page is downloaded, the facility locates the rating in the downloaded web page. Second, a rating bureau may provide the rating. The facility may send the URL of the web page to the rating bureau and receive the rating in return. Third, if the rating is not available, the facility assumes that the web page should not be presented to the user.

The facility also allows the rating level of the web pages that can be presented on a user-by-user basis. A system administrator may be responsible for setting the rating levels. For example, the administrator may set the rating level for one user so that web pages with sexually explicit language can be presented. However, web pages that include sexually explicit picture would not be presented to that user because they would have a higher rating level.

In a further embodiment, the facility is used to download web pages or other bodies of data containing executable code. The facility uses credentials similar to ratings to determine whether the contained code is safe to execute. If the facility is unable to determine from the credentials that the code is safe to execute, the facility continues to download the body of data while it prompts the user for authorization to execute the code despite that its credentials do not necessarily indicate that the code is safe to execute.

DETAILED DESCRIPTION OF THE INVENTION

The present invention provides an improved approach to downloading a web page or other data that has been automatically rejected from presentation or execution, but whose rejection may be either confirmed or overridden by the user. In a preferred embodiment, a downloading software facility ("the facility") receives a request from a user to display a web page, which is typically identified by a URL. The facility then initiates downloading of the web page. While the web page is being downloaded, the facility obtains the rating of the web page. If the rating indicates that the web page should not be presented to the user, the facility prompts the user for authorization to present the web page despite its rating. This prompting is performed while the web page is being downloaded. If the user does not provide authorization, then the facility aborts the downloading. If the user does provide authorization, then the facility does not interrupt the downloading and presents the web page to the user. Because the facility continues to download the web page while prompting for authorization, the download is completed sooner than if the facility had suspended the downloading while prompting for authorization. The facility also does not present any portion of the web page until authorization is provided so that the web page is not presented to a unauthorized user.

The facility can obtain the rating of the web page in various ways. First, the web page itself may contain the rating. Thus, as the web page is downloaded, the facility locates the rating in the downloaded web page. Second, a rating bureau may provide the rating. The facility may send the URL of the web page to the rating bureau and receive the rating in return. Third, if the rating is not available, the facility assumes that the web page should not be presented to the user.

The facility also allows the rating level of the web pages that can be presented on a user-by-user basis. A system administrator may be responsible for setting the rating levels. For example, the administrator may set the rating level for one user so that web pages with sexually explicit language can be presented. However, web pages that include sexually explicit picture would not be presented to that user because they would have a higher rating level.

In a further embodiment, the facility is used to download web pages or other bodies of data containing executable code. The facility uses credentials similar to ratings to determine whether the contained code is safe to execute. If the facility is unable to determine from the credentials that the code is safe to execute, the facility continues to download the body of data while it prompts the user for authorization to execute the code despite that its credentials do not necessarily indicate that the code is safe to execute. In this embodiment, the facility preferably presents any other contents of the web page containing the executable code even if rejection of the contained code has not been overridden. The facility only allows the contained code to be executed if and when its rejection is overridden.

Figure 1:
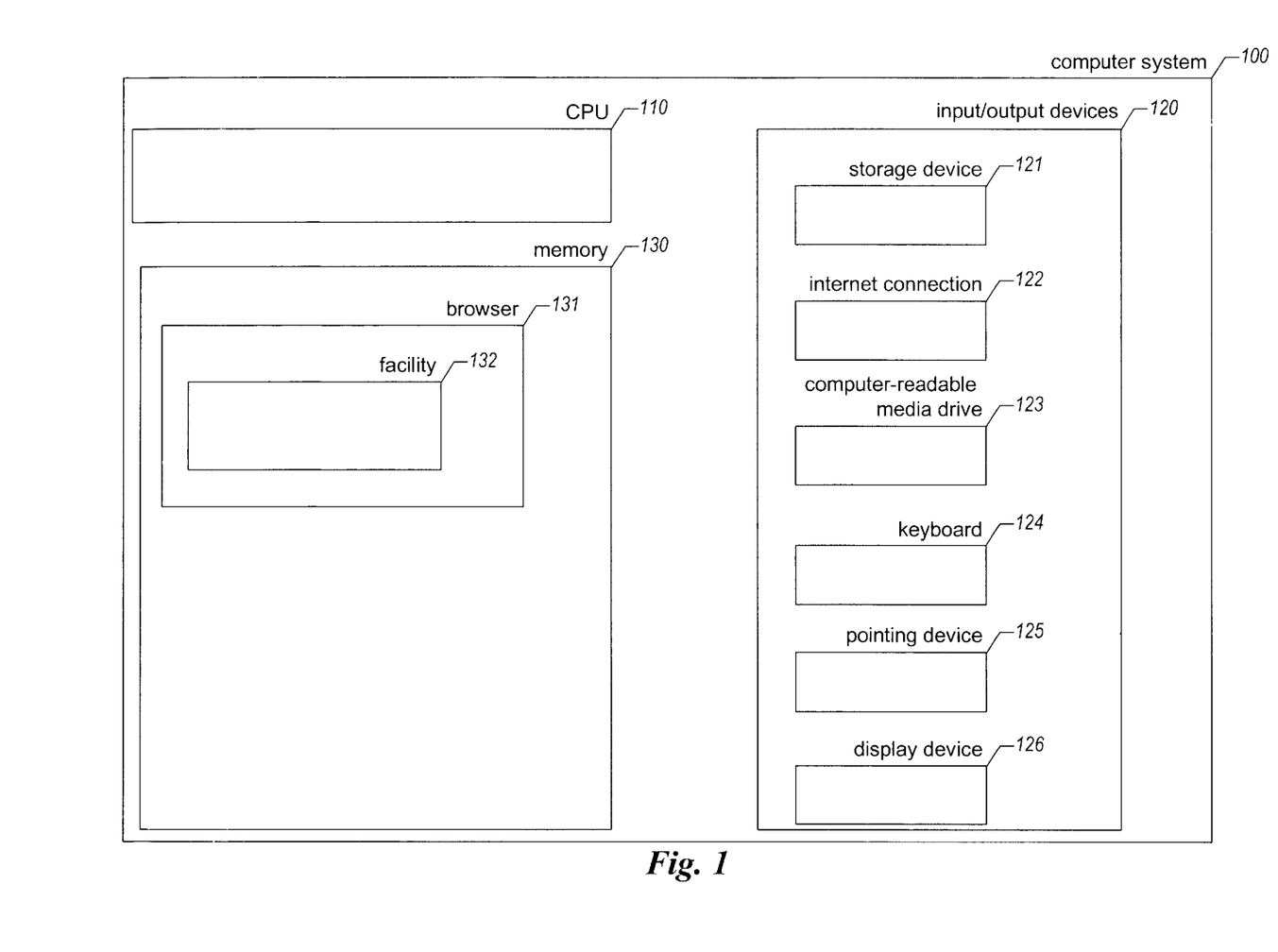
FIG. 1 is a high-level block diagram of the general-purpose computer system upon which the facility preferably executes.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121, such as a hard disk drive; an Internet connection 122 for connecting to other computers via the Internet, such as a persistent network connection or an intermittent modem connection; a computer-readable media drive 123, which can be used to install software products, including the facility, which are provided on a computer-readable medium, such as a CD-ROM; a keyboard 124 for inputting text; a pointing device 125, such as a mouse, for selecting locations; and a display device 126, such as a video monitor, for displaying visual information such as windows and their contents. The memory 130 preferably contains the facility 132, which is incorporated in a browser 131. While the facility is preferably implemented on a computer system configured as described above, those skilled in the art will recognize that it may also be implemented on computer systems having different configurations.

In order to more completely describe the operation of the facility, its operation is discussed in the context of an example. FIGS. 2–7 are screen diagrams illustrating the example.

Figure 2:
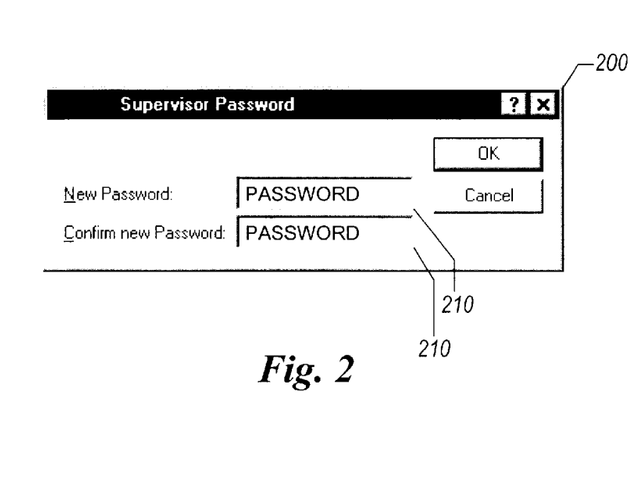
FIG. 2 is a screen diagram showing a user interface for entering a password for overriding the automatic rejection of a web page.
Figure 3:
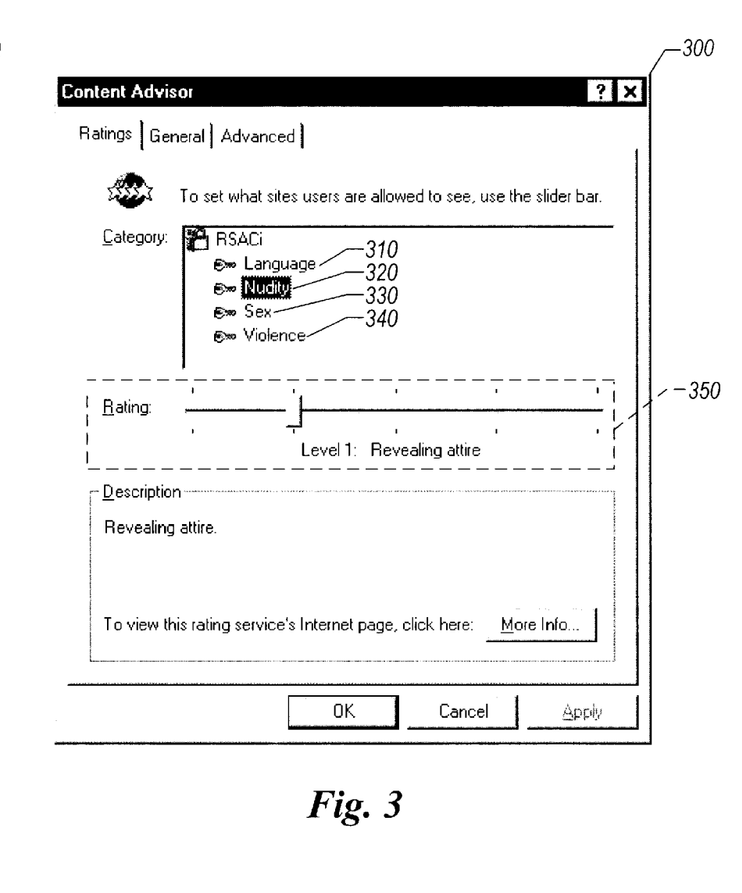
FIG. 3 is a screen diagram showing a user interface for setting various rating levels.

FIGS. 2 and 3 show the user entering information used by the facility in order to control the presentation of web pages having particular contents. FIG. 2 is a screen diagram showing a user interface for entering a password for overriding the automatic rejection of a web page. This user interface displays a dialog box 200 which contain password fields 210 for entering the password. FIG. 2 shows the entry of the password "PASSWORD" by the user into the password fields 210. While the password "PASSWORD" is shown as displayed in password fields 210 for clarity, the password is preferably not actually displayed in order to prevent it from being visually intercepted. Instead, a placeholder character such as an asterisk ("*") is displayed each time the user types a character of the password. Thus, rather than containing the password "PASSWORD", the password fields 210 would each actually contain the string "********".

FIG. 3 is a screen diagram showing a user interface for setting various rating levels. This user interface displays a dialog box 300 that may be used to set a rating level 350 for each of a number of rating categories 310, 320, 330, and 340. Web pages rated in accordance with the rating system utilized by the facility have a rating level for each of the displayed rating categories. The facility allows the user to set a rating level for each of these rating categories, and ensures that any web page having a high rating level in any rating category will be automatically rejected if downloaded. For example, FIG. 3 shows the user setting level 1, corresponding to revealing attire, for the nudity rating category. Setting the rating level for the nudity rating category at level 1 causes the facility to automatically reject web pages that have a rating level higher than level 1 in the nudity rating category.

Figure 4:
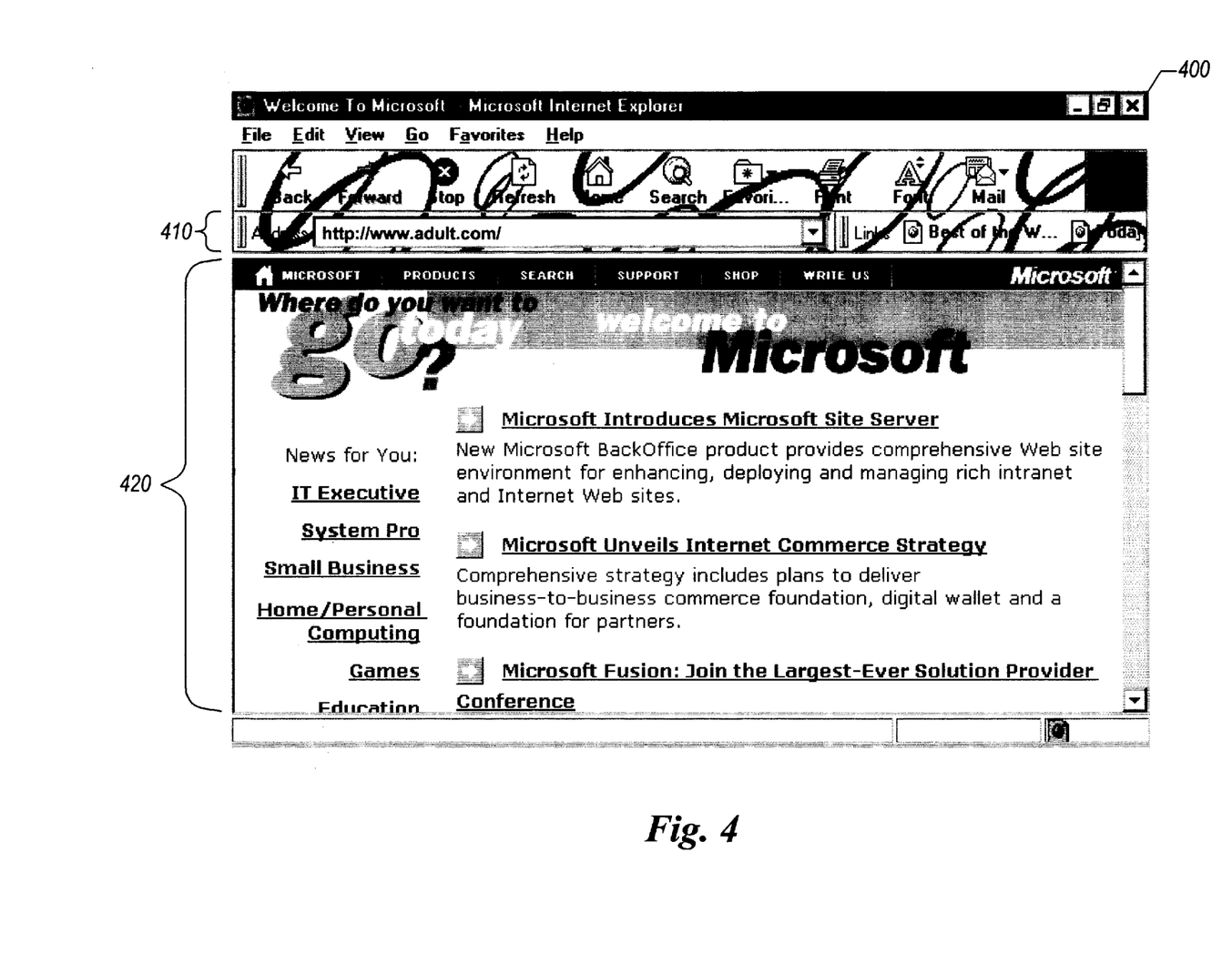
FIG. 4 is a display diagram showing the presentation of an initial web page in a browser window.

FIGS. 4–7 show the operation of the facility while using a web browser. FIG. 4 is a display diagram showing the presentation of an initial web page in a browser window. The browser displays a browser window 400. The browser window contains a URL field 410 into which a user can type a URL in order to present the corresponding web page. The browser window also includes a client area, or "presentation area," 420 in which it presents the web page corresponding to the entered URL. Those skilled in the art will appreciate that approaches to selecting a web page for presentation other than entering its URL into a URL field may be used, such as selecting a link in a presently-displayed web page. For the purposes of the present invention, all such approaches to selecting a web page for presentation are equivalent.

It can be seen from FIG. 4 that the browser is displaying in the presentation area 420 an initial web page. The initial web page is a Microsoft® home page, displayed by the browser in response to the user entering its URL into the URL field 410. Subsequent to the display of the initial web page in the presentation area 420, the user typed the URL "http://www.adult.com/" into the URL field 410 in order to cause the browser to present another web page, an Adult home page. The facility proceeds to determine whether to present this requested web page.

While continuing to present the initial web page in the presentation area 420, the facility initiates the downloading of the requested web page corresponding to the new URL. From the partially-downloaded web page, the facility obtains the rating information for the requested web page, including a rating level for the requested web page for each rating category. The facility compares these rating levels for the requested web page to the rating levels set by the user as shown in FIG. 3. As the result of this comparison, the facility determines that the rating levels of the requested web page exceed the rating levels set by the user in several rating categories. The facility therefore determines that the requested web page should be rejected.

Figure 5:
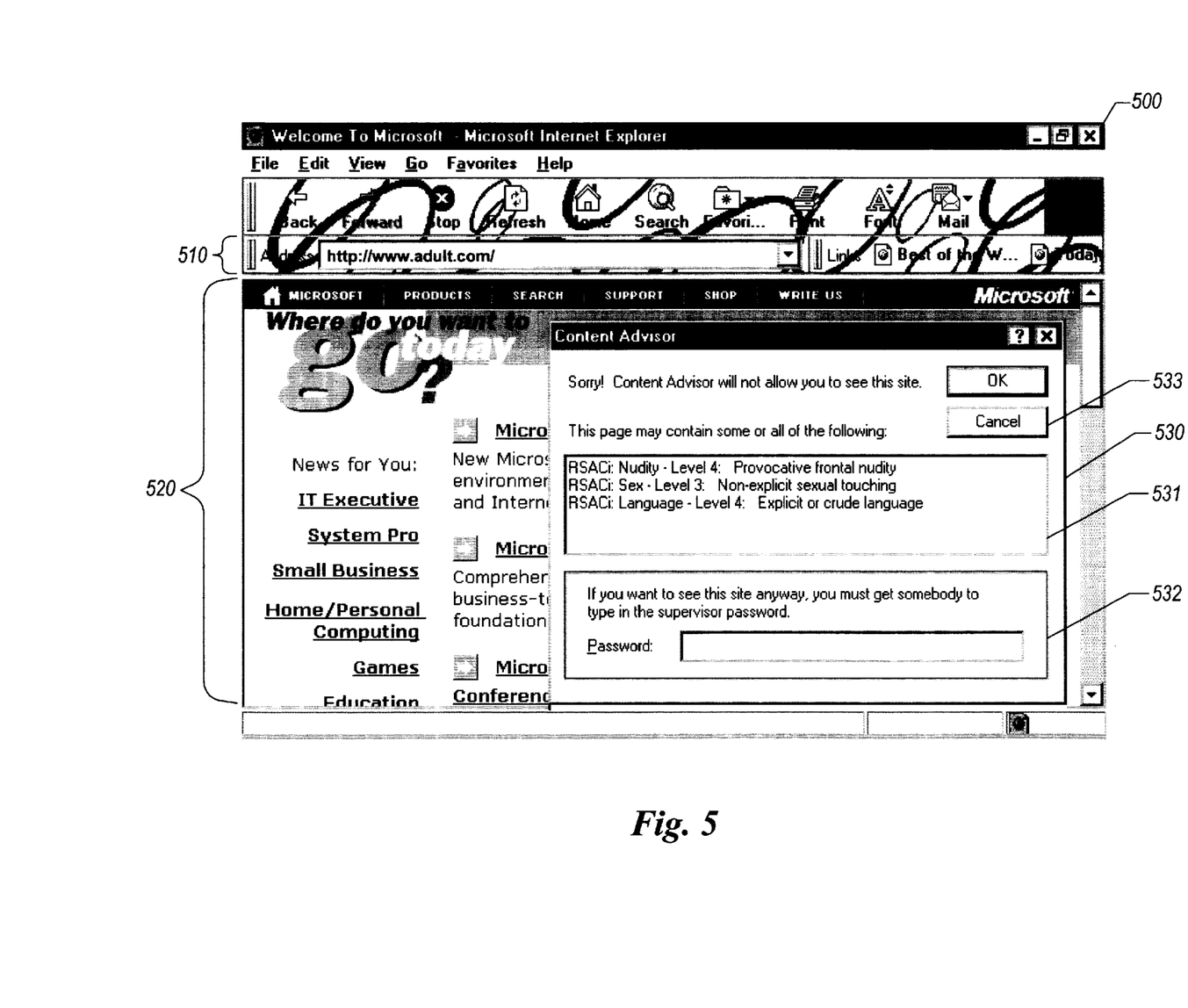
FIG. 5 is a screen diagram showing a user interface provided by the facility for overriding the rejection of a requested web page.
Figure 6:
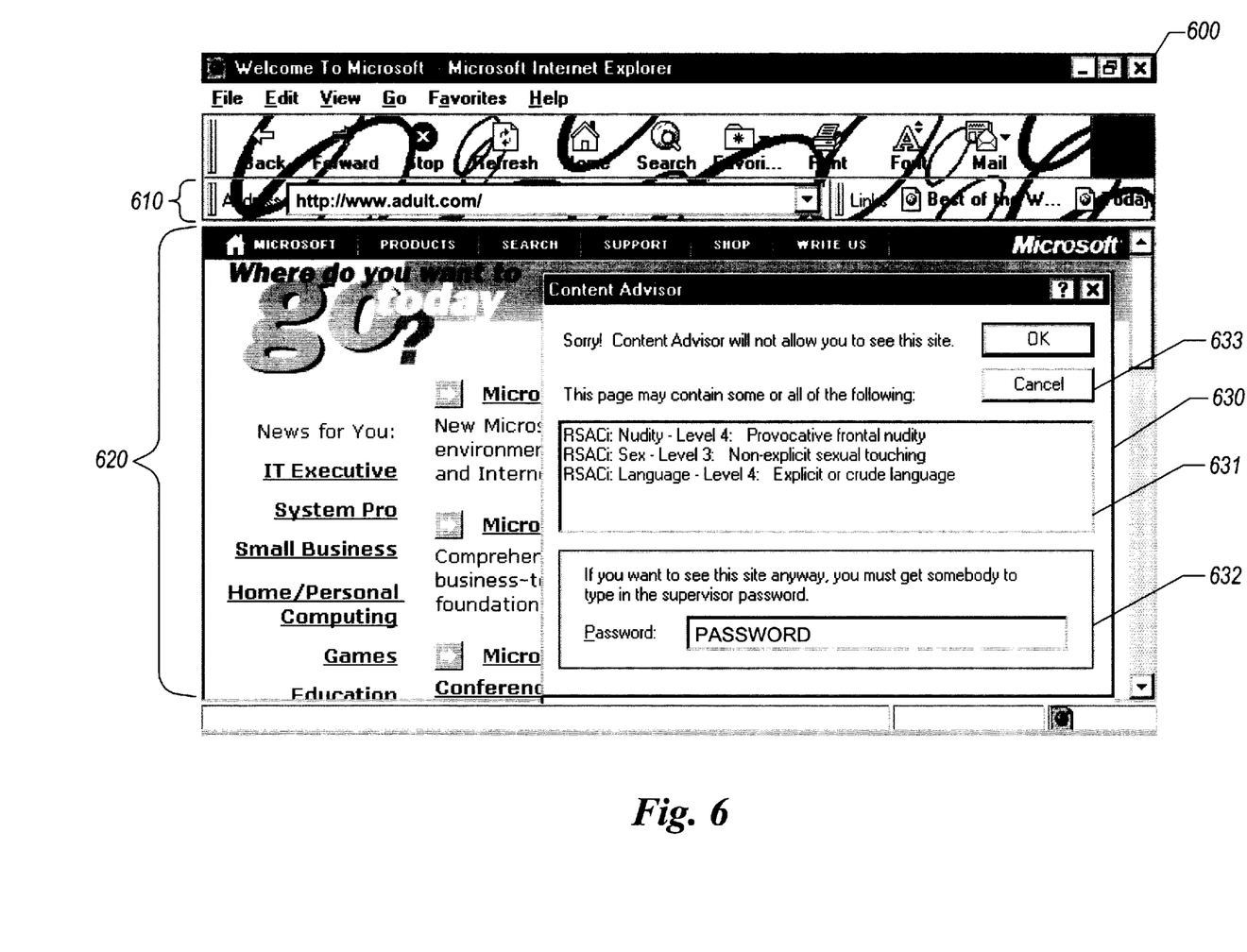
FIG. 6 is a display diagram showing the user entering a password in the password field in order to override the rejection of the requested web page and present the web page.
Figure 7:
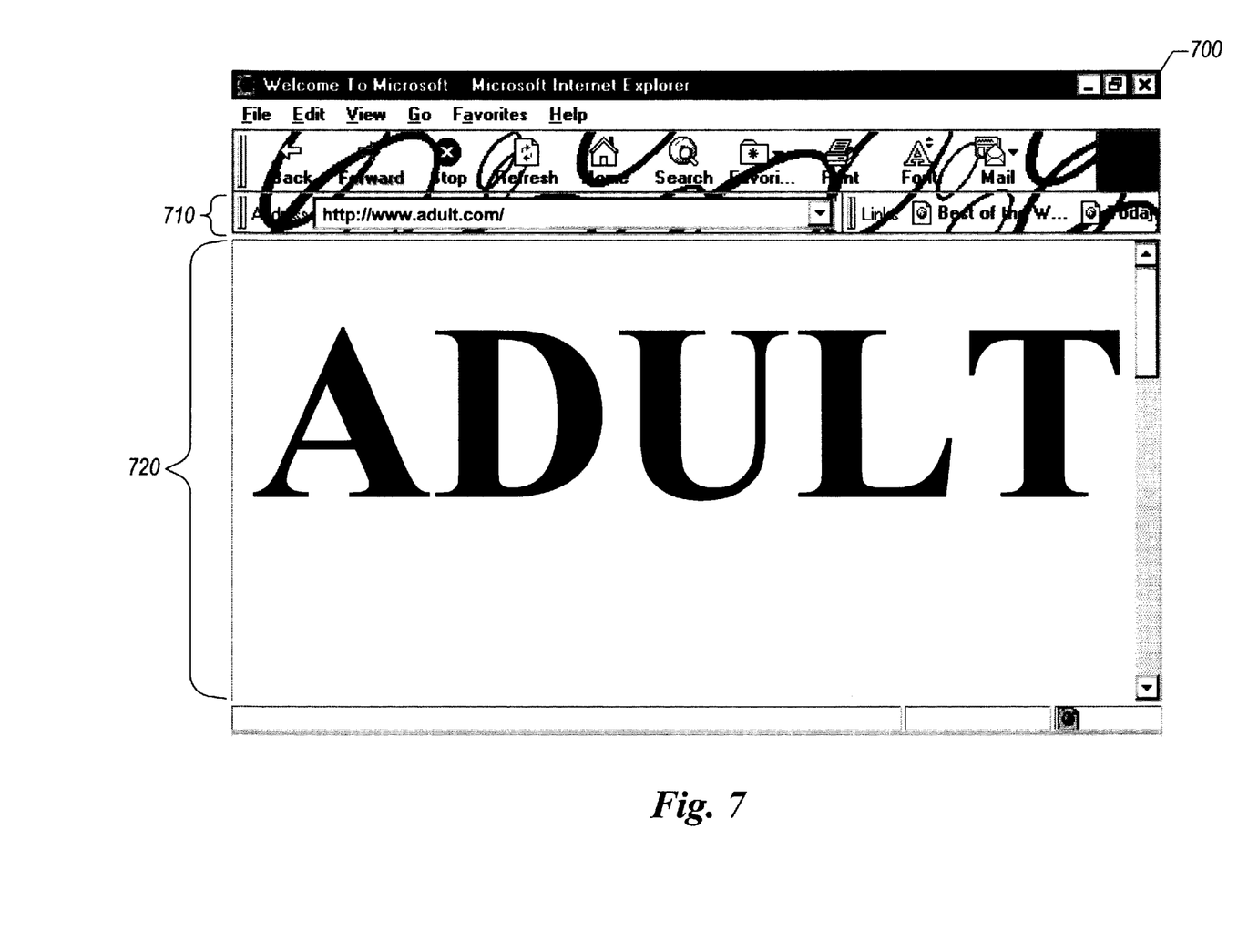
FIG. 7 is a screen diagram showing the presentation of the web page in the presentation area after its rejection is overridden.

FIG. 5 is a screen diagram showing a user interface provided by the facility for overriding the rejection of the requested web page. The user interface for overriding a rejection displays a dialog box 530. The dialog box contains an indication 531 of the reason for rejecting the requested web page. The dialog box further contains a password field 532 into which the user may type the password set as shown in FIG. 2 in order to override the rejection of the requested web page and present the web page. The dialog box further contains a cancel button 533 which the user may use to confirm the rejection of the web page. If the user uses the cancel button 533 to confirm the rejection of the web page, the facility terminates the downloading of the requested web page, and the requested web page is never presented. In this case, the display of the initial web page continues as shown in FIG. 4. If, on the other hand, the user enters the password in the password field 532 to override the rejection of the requested web page, the requested web page is immediately presented, and its downloading is permitted to continue to completion. FIG. 6 is a display diagram showing the user entering the password "PASSWORD" in the password field 632 in order to override the rejection of the requested web page and present the requested web page. Again, the password is preferably displayed using placeholder characters to prevent its visual interception. FIG. 7 is a screen diagram showing the presentation of the requested web page in the presentation area 720 after its rejection is overridden. Until the user uses the interface to confirm or override the rejection, however, the facility continues to download the requested web page. This expedites the completion of downloading and complete presentation of the web page.

Figure 8:
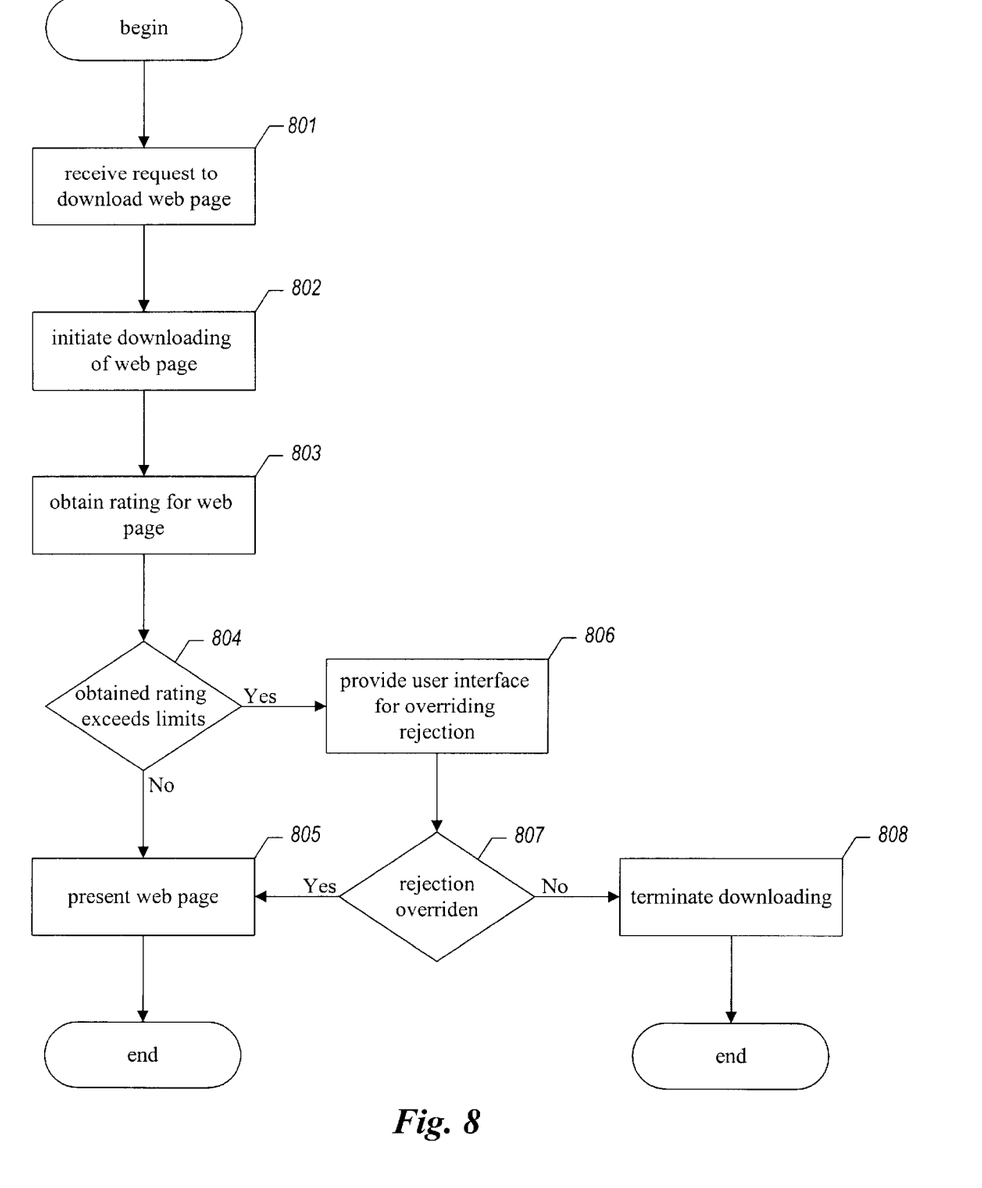
FIG. 8 is a flow diagram showing the steps preferably performed by the facility in order to download and present a single web page.

FIGS. 8–11 show the operation of the facility at a more detailed level. FIG. 8 is a flow diagram showing the steps preferably performed by the facility in order to download and present a single web page. In step 801, the facility receives a request to download a web page specifying a URL for the web page. As mentioned above, the request may take the form of entering a URL into a URL field 410, clicking on a hypertext link in the currently-presented web page, or any other web navigation technique. In step 802, the facility uses the URL specified by the request to initiate the downloading of the requested web page. Because the facility continues to perform additional steps while the web page is being downloaded, step 802 preferably initiates the downloading of the requested web page asynchronously. Asynchronously downloading a web page in the Microsoft® Windows®95 operating system involves the use of URL monikers. URL monikers and their use to download web pages asynchronously are completely described in U.S. patent application Ser. No. 08/761,709 entitled "OBJECT-ORIENTED FRAMEWORK FOR HYPERLINK NAVIGATION," which is hereby incorporated by reference in its entirety.

In step 803, the facility obtains a rating for the requested web page. The rating for the requested web page characterizes the content of the requesting web page, and is obtained either from the partially-downloaded contents of the requested web page, or from a ratings bureau that is dedicated to providing ratings for web pages. The obtained rating is preferably expressed and interpreted in accordance with an accepted rating standard. In a preferred embodiment, the "PICS Label Distribution Label Syntax and Communication Protocols" rating standard, published by the World Wide Web Consortium, is used. Those skilled in the art will appreciate that other rating systems characterizing the content of web pages or other bodies of data may also be used. Indeed, in one preferred embodiment, ratings are expressed and interpreted using a certification system for characterizing the effects or trustedness of executable code.

In step 804, if the rating obtained for the requested web page in step 803 exceeds any rating level set by the user, then the facility continues at step 806 to automatically reject the web page, else the facility continues at step 805. In step 805, the facility presents the web page in the presentation area, displacing the presentation of the last-presented web page. Because downloading of the web page is asynchronous, downloading the web page may continue after the web page is presented in step 805. After step 805, these steps conclude.

In step 806, the facility provides a user interface, such as the user interface shown in FIG. 5, for overriding the rejection of the requested web page. If a modal dialog box is used in this user interface as shown in FIG. 5, the facility preferably displays the modal dialog box using a thread of execution other than the threads of execution in which the web page is being downloaded and processed.

In step 807, if the provided user interface is used to override the rejection, then the facility continues at step 805 to present the requested web page, else if the provided user interface is used to confirm the rejection, then the facility continues at step 808. In step 808, the facility terminates the downloading of the requested web page initiated in step 802, and these steps conclude. Unless and until the facility terminates the downloading of the web page in step 808, however, such downloading continues to completion. If the requested web page is rejected and its rejection is not overridden, the requested web page is never presented.

Figure 9:
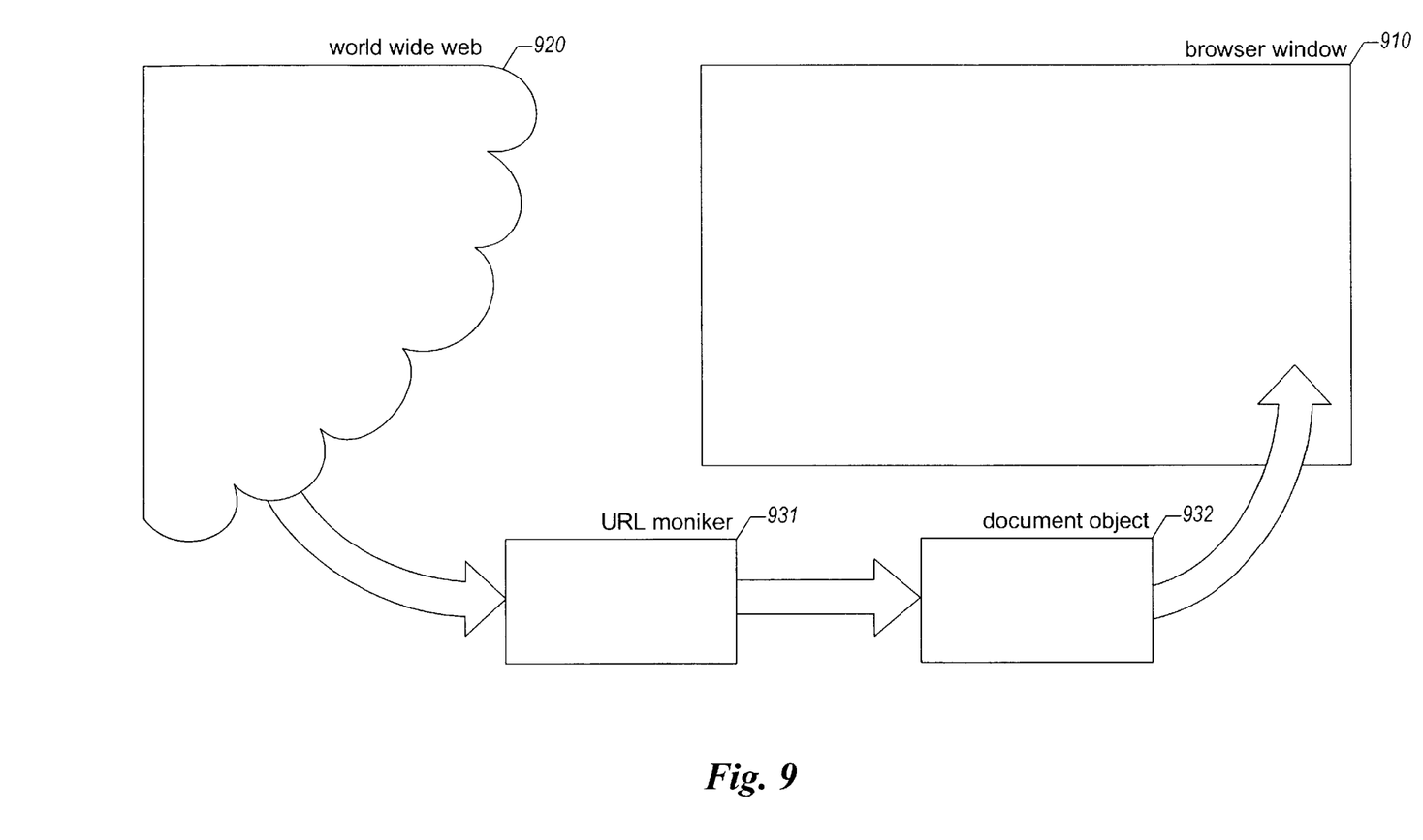
FIG. 9 is a data flow diagram showing the facility downloading and presenting an initial web page.
Figure 10:
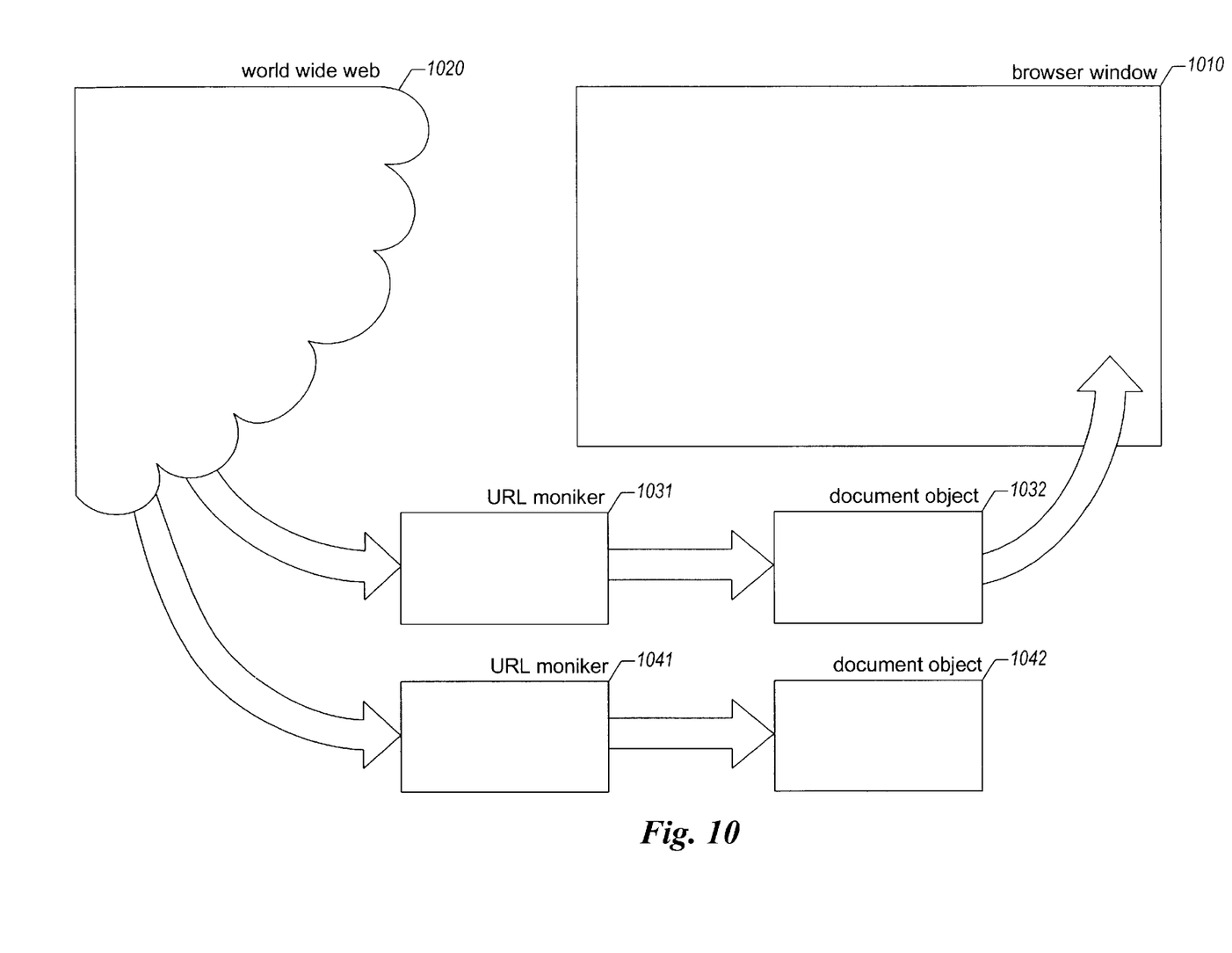
FIG. 10 is a data flow diagram showing the facility downloading a newly-requested web page before its rejection is overridden.
Figure 11:
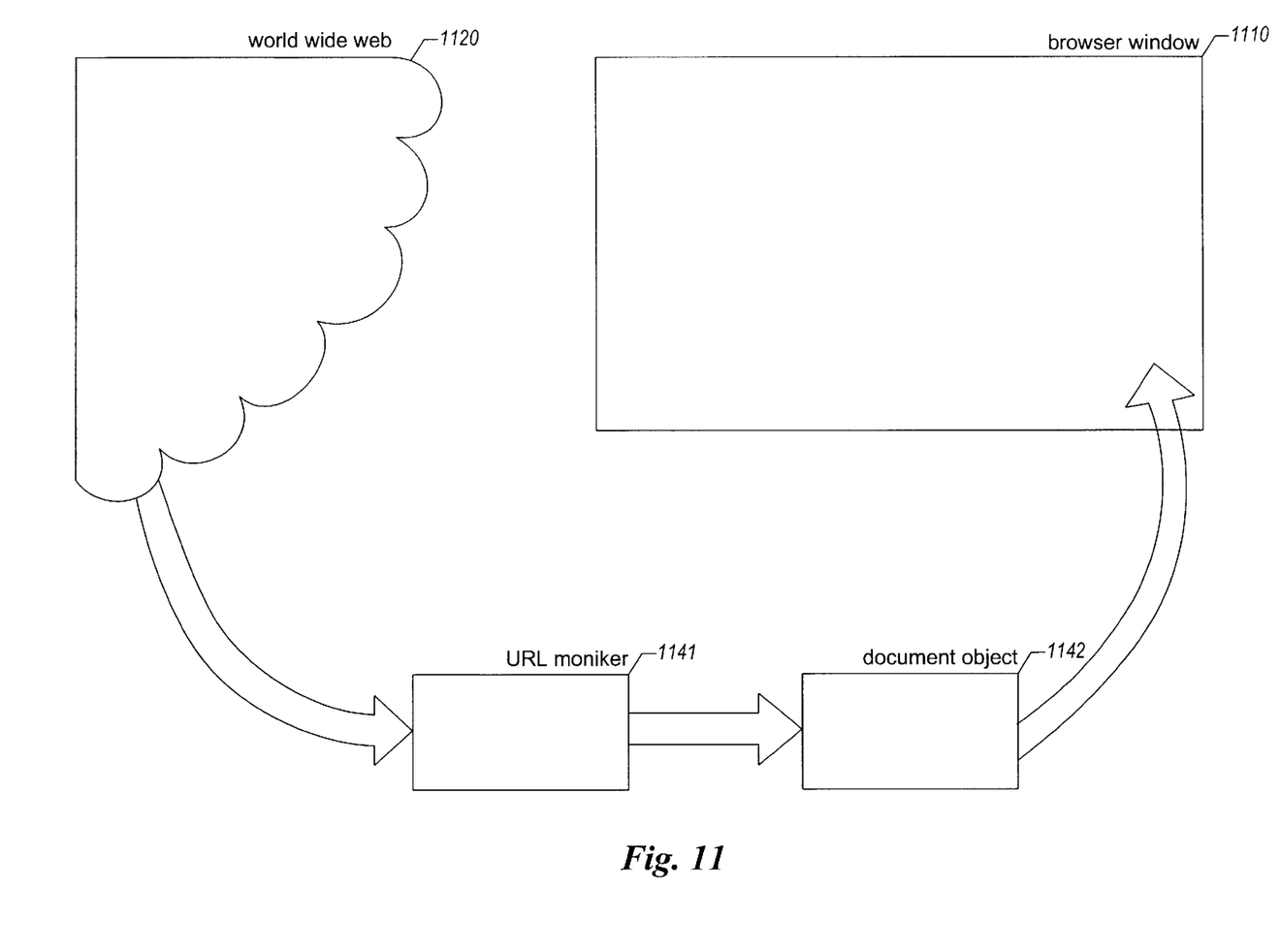
FIG. 11 is a data flow diagram showing the facility presenting a web page whose rejection has been overridden.

FIGS. 9–11 are data flow diagrams that show the use of URL monikers and document objects to download and present web pages in the Microsoft® Windows® 95 operating system, respectively. FIG. 9 is a data flow diagram showing the facility downloading and presenting an initial web page. The facility uses a URL moniker 931 to asynchronously download the initial web page from the world wide web 920. As mentioned above, the use of URL monikers is discussed in U.S. patent application Ser. No. 08/761,709. The facility further creates a document object 932 to present the web page data downloaded by the URL moniker in the presentation area of a browser window 910. The use of document objects to present visual information is described in detail in U.S. patent application Ser. No. 08/506,073 entitled "METHOD AND SYSTEM FOR LOGICALLY PARTITIONING A VIEW OF A DOCUMENT OBJECT FROM A FRAME IN WHICH THE DOCUMENT OBJECT IS DISPLAYED," and U.S. Pat. No. 5,613,058 entitled "METHOD AND SYSTEM FOR IN-PLACE INTERACTION WITH CONTAINED OBJECTS," which are both hereby incorporated by reference in their entirety. While the web page is being downloaded asynchronously by the URL moniker, the document object preferably uses a portion of the web page downloaded so far to partially present the web page in the browser window. The presentation of the web page by the document object preferably involves the execution of any executable code contained by the web page, such as ActiveX controls used with the Microsoft® Internet Explorer® Browser and the Microsoft® Windows® 95 operating system.

FIG. 10 is a data flow diagram showing the use of a second URL moniker and document object to download a newly-requested web page before its rejection is overridden. FIG. 10 shows that, while the initial web page has been downloaded by URL moniker 1031 and is being presented by document object 1032, a new URL moniker 1040 and a new document object 1042 have been created to download and present the requested web page. In response to the request, the facility uses the URL moniker 1041 to asynchronously download the requested web page from the World Wide Web. The new URL moniker 1041 routes the data comprising the requested web page to the new document object 1042 as the data is downloaded. Until the requested web page is rejected and that rejection is overridden, however, new document object 1042 does not present the requested web page in the browser window. Instead, document object 1032 continues to present the initial web page in the browser window. If the facility is using internal rating information stored within the web page, the facility may extract this rating information from the web page in either the URL moniker 1041 or the document object 1042. On the other hand, if the facility obtains the rating information from another source, the facility preferably uses a third URL moniker (not shown) to obtain the rating information from that external source via the world wide web.

FIG. 11 is a data flow diagram showing the facility presenting a web page whose rejection has been overridden. When the user uses the rejection overriding user interface to override the rejection of the requested web page, the facility causes the new document object 1142 to present the new web page in the browser window 1110. As can further be seen from FIG. 11, the facility at this point deletes the initial URL moniker 1031 and initial document object 1032, as these objects are no longer needed.

Figure 12:
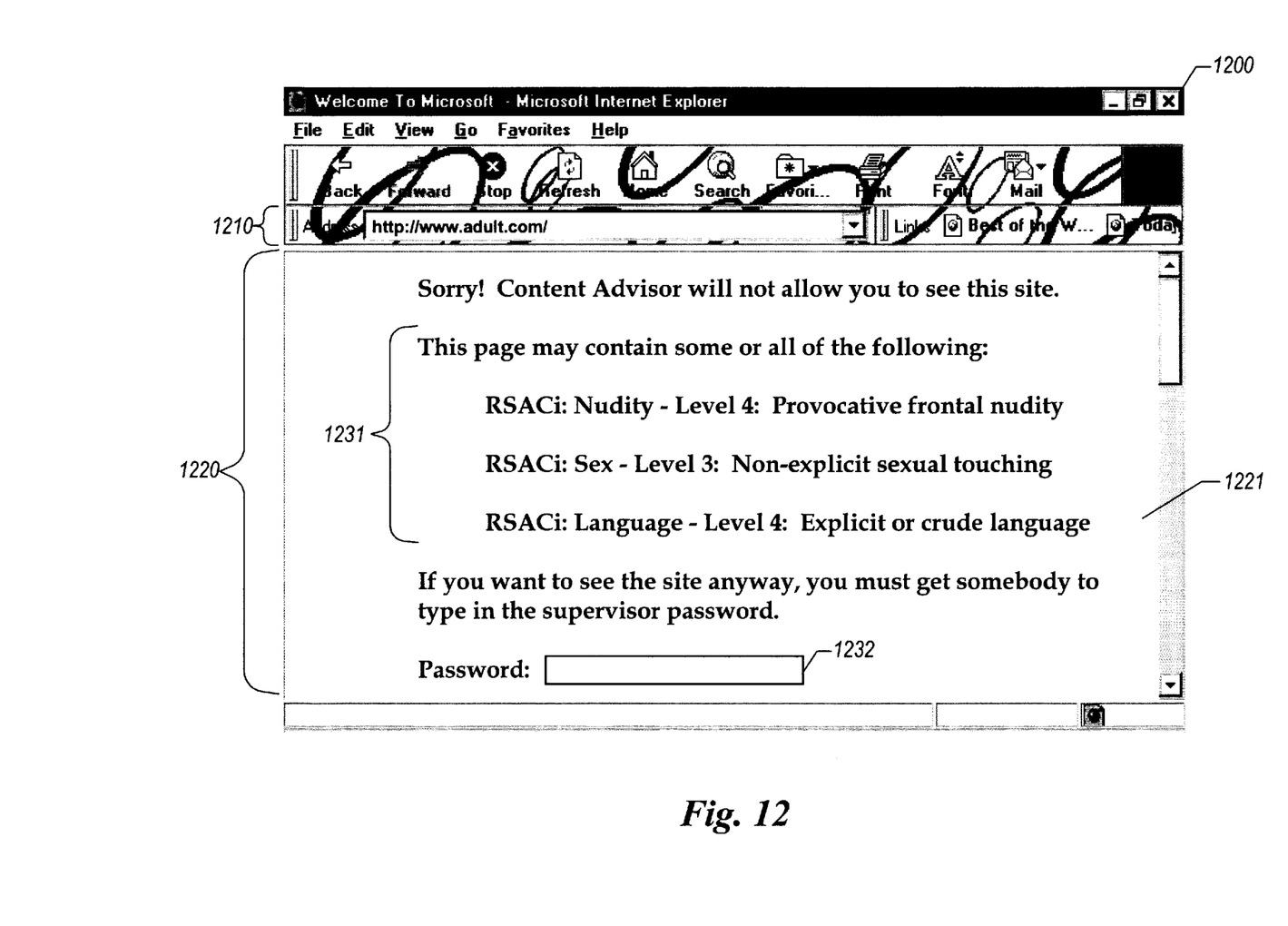
FIG. 12 is a screen diagram showing the use of a special web page to override the rejection of a requested web page.

In a further embodiment, the facility uses a special web page in place of the dialog box 530 (FIG. 5) as the user interface for overriding the rejection of a requested web page. FIG. 12 is a screen diagram showing the use of a special web page to override the rejection of a requested web page. FIG. 12 shows that, in accordance with this embodiment of the invention, the facility presents a special web page 1221 in the presentation area 1220, replacing the presentation of the initial web page. The special web page 1221, like the dialog box 530 (FIG. 5), contains an indication 1231 of the reason for rejecting the requested web page. The special web page further contains a password field 1232 in which the user may enter the password to override the rejection of the requested web page and present the requested web page.

In accordance with this embodiment, the facility replaces the URL moniker 1031 and document object 1032 object (FIG. 10) for the initial web page with a URL moniker and document object for the special web page (not shown). This embodiment is particularly useful when used with web pages containing frames. A web page containing frames essentially embeds other entire web pages, individually called frames. In cases in which several frames are rejected, the facility will present the special web page in each rejected frame allowing the user to easily (A) determine which frames have been rejected, and (B) override the rejection of particular frames.

While the invention has been shown and described with reference to preferred embodiments, it will be understood by those skilled in the art that various changes or modifications in form and detail may be made without departing from the scope of the invention. For example, the facility may be used to control the execution of executable code contained by a web page other than ActiveX controls. Further, the facility may be used to control the use of data other than web pages. Also, the facility may use a variety of other rating or content characterization systems to automatically reject a web page or body of data. Indeed, the facility may reject a web page or body of data based upon its own analysis of its content rather than a preformulated characterization of its content, such as a rating. In fact, the facility may be applied in any situation in which the retrieval of data is subject to a user's response or some other asynchronous event.

We claim:

1. A method in a computer system for downloading a web page that subject to a rating, the method comprising the steps of:

receiving a request from a user to present an identified web page;

retrieving user parameters identifying a set of ratings acceptable for the user;

initiating downloading of the identified web page;

during the downloading of the identified web page, obtaining a rating characterizing the identified web page;

determining that the obtained rating is not among the set of ratings acceptable for the user;

in response to the determining step, providing a user interface for authorizing the presentation of the identified web page, despite that the web page rating is not among the set of ratings acceptable for the user, while downloading of the identified web page proceeds; and when the provided user interface is used to authorize the presentation of the identified web page, presenting the identified web page.

2. The method of claim 1, further comprising the step of receiving in the provided user interface a password authorizing the presentation of the identified web page.

3. The method of claim 1 wherein the providing step provides a dialog box for authorizing the presentation of the identified web page.

4. The method of claim 1 wherein the providing step presents a web page for authorizing the presentation of the identified web page.

5. The method of claim 1 wherein downloading of the identified web page continues during the performance of the presenting step.

6. The method of claim 1 wherein the obtaining step includes the step of extracting a rating from the web page.

7. The method of claim 1 wherein the obtaining step includes the step of retrieving a rating from a rating bureau.

8. The method of claim 1, further comprising the steps of:
before the performance of the receiving step, presenting a foregoing web page have a rating among the set of ratings acceptable for the user; and
continuing to display the foregoing web page until the provided user interface is used to authorize the presentation of the identified web page.

9. A computer-readable medium whose contents cause a computer system to download and present a web page that has a rating by performing the steps of:
receiving a request to present an identified web page;
initiating downloading of the identified web page;
during the downloading of the identified web page,
obtaining the rating of the identified web page; and
when the obtained rating indicates that the identified web page should not be presented, requesting authorization to present the identified web pages despite the rating of the identified web page; and
when authorization is received, presenting the identified web page.

10. The computer-readable medium of claim 9 wherein the contents of the computer-readable medium further cause the computer system to receive a password authorizing the presentation of the identified web page.

11. The computer-readable medium of claim 9 wherein the obtaining step includes the step of extracting a rating from the web page.

12. The computer-readable medium of claim 9 wherein the obtaining step includes the step of retrieving a rating from a rating bureau.

13. The computer-readable medium of claim 9 wherein the contents of the computer-readable medium further cause the computer system to perform the steps of:
before the performance of the receiving step, presenting a foregoing web page having a rating among the set of ratings acceptable for the user; and
continuing to display the foregoing web page until authorization is received to present the identified web page.

14. A method in a computer system for downloading a web page, the method comprising the steps of:
receiving a request from a user to present an identified web page;
initiating downloading of the identified web page;
during the downloading of the content of the identified web page, determining that no rating characterizing the content of the identified web page is available;
in response to the determining step, providing a user interface for authorizing the presentation of the identified web page, despite that no rating characterizing the content of the identified web page is available, while downloading of the identified web page proceeds; and
when the provided user interface is used to authorize the presentation of the identified web page, presenting the identified web page.

15. A method in a computer system for downloading a web page containing executable code, the method comprising the steps of:
receiving a request from a user to present an identified web page;
initiating downloading of the identified web page;
during the downloading of the identified web page, determining that the identified web page contains executable code;
in response to the determining step, providing a user interface for authorizing the execution of the executable code contained by the identified web page, while downloading of the identified web page proceeds; and
when the provided user interface is used to authorize the execution of the executable code contained in the identified web page, enabling the execution of the contained executable code.

16. The method of claim 15 wherein the code contained by the web page is an ActiveX control.

17. The method of claim 15, further comprising the step of obtaining credentials characterizing the level of trustedness of the contained code, and wherein the user interface provided by the providing step conveys the obtained credentials characterizing the level of trustedness of the contained code.

18. The method of claim 15, further comprising the steps of:
obtaining credentials characterizing the level of trustedness of the contained code;
retrieving user parameters identifying a set of credentials acceptable to the user; and
determining that the obtained credentials are not among the set of credentials acceptable to the user,
and wherein the providing step provides a user interface for authorizing the execution of the executable code contained by the identified web page, despite that the obtained credentials are not among the set of credentials acceptable to the user.

19. The method of claim 15, further comprising the step of:
during the downloading of the identified web page, determining that no credentials characterizing the level of trustedness of the contained code are available,
and wherein the providing step provides a user interface for authorizing the execution of the executable code contained by the identified web page, despite that no credentials characterizing the level of trustedness of the contained code are available.

20. The method of claim 15, further comprising the step of, until the provided user interface is used to authorize the execution of the executable code contained in the identified web page, presenting the identified web page with the execution of the executable code disabled.

21. A computer-readable medium whose contents cause a computer system to download a web page containing executable code by performing the steps of:
receiving a request to present an identified web page;
initiating downloading of the identified web page;
during the downloading of the identified web page, if the identified web page contains executable code, requesting authorization to execute the executable code contained by the identified web page, while downloading of the identified web page proceeds; and
when authorization is received, enabling the execution of the contained executable code.

22. The computer-readable medium of claim 21 wherein the contents of the computer-readable medium further cause the computer system to perform the step of obtaining credentials characterizing the level of trustedness of the contained code, and wherein the user interface provided by the providing step conveys the obtained credentials characterizing the level of trustedness of the contained code.

23. The computer-readable medium of claim 21 wherein the contents of the computer-readable medium further cause the computer system to perform the step of, until the provided user interface is used to authorize the execution of the executable code contained in the identified web page, presenting the identified web page with the execution of the executable code disabled.

24. The computer-readable medium of claim 21 wherein the contents of the computer-readable medium further cause the computer system to perform the steps of:
   obtaining credentials characterizing the level of trustedness of the contained code;
   retrieving user parameters identifying a set of credentials acceptable to the user; and
   determining that the obtained credentials are not among the set of credentials acceptable to the user,
and wherein the providing step provides a user interface for authorizing the execution of the executable code contained by the identified web page, despite that the obtained credentials are not among the set of credentials acceptable to the user.

25. The computer-readable medium of claim 21 wherein the contents of the computer-readable medium further cause the computer system to perform the step of:
   during the downloading of the identified web page, determining that no credentials characterizing the level of trustedness of the contained code are available,
and wherein the providing step provides a user interface for authorizing the execution of the executable code contained by the identified web page, despite that no credentials characterizing the level of trustedness of the contained code are available.

26. A method in a computer system for retrieving and using a body of data, the method comprising the steps of:
   receiving a request to retrieve and use an identified body of data;
   initiating retrieval of the identified body of data;
   during the retrieval of the identified body of data, automatically rejecting the use of the identified body of data;
   in response to the rejecting step, requesting authorization to use of the identified body of data, while retrieval of the identified body of data proceeds; and
   when the authorization is provided, using the identified body of data in accordance with the received request.

27. The method of claim 26, further comprising the step of identifying contents of the identified body of data as objectionable, and wherein the rejecting step is performed in response to the identifying step.

28. The method of claim 27, further comprising the step of, during the retrieval of the identified body of data, analyzing the contents of the identified body of data retrieved so far, and wherein the identifying step is performed in response to the analyzing step.

29. The method of claim 27, further comprising the steps of:
   during the retrieval of the identified body of data, obtaining a characterization of the contents of the identified body of data;
   comparing the obtained characterization to user parameters indicating a set of characterizations acceptable for the user; and
   based upon the comparing step, determining that the obtained characterization is not among the set of characterizations acceptable for the user,
and wherein the identifying step is performed in response to the determining step.

30. The method of claim 29 wherein the obtaining step includes the step of extracting the characterization from the contents of the identified body of data retrieved so far.

31. The method of claim 29 wherein the obtaining step includes the step of obtaining the characterization from a source outside the identified body of data.

32. The method of claim 29 wherein the body of data identified by the received request is a computer program.

33. The method of claim 29 wherein the body of data identified by the received request is a web page.

34. A computer-readable medium whose contents cause a computer system to retrieve and use a body of data by performing the steps of:
   receiving a request to retrieve and use an identified body of data;
   initiating retrieval of the identified body of data;
   during the retrieval of the identified body of data, automatically rejecting the use of the identified body of data;
   in response to the rejecting step, providing a user interface for authorizing the use of the identified body of data, while retrieval of the identified body of data proceeds; and
   when the provided user interface is used to authorize the use of the identified body of data, using the identified body of data in accordance with the received request.

35. The computer-readable medium of claim 34 wherein the contents of the computer-readable medium further cause the computer system to perform the steps of:
   during the retrieval of the identified body of data, obtaining a characterization of the contents of the identified body of data;
   comparing the obtained characterization to user parameters indicating a set of characterizations acceptable for the user; and
   based upon the comparing step, determining that the obtained characterization is not among the set of characterizations acceptable for the user,
and wherein the rejecting step is performed in response to the determining step.

36. The computer-readable medium of claim 35 wherein the obtaining step includes the step of extracting the characterization from the contents of the identified body of data retrieved so far.

37. The computer-readable medium of claim 35 wherein the obtaining step includes the step of obtaining the characterization from a source outside the identified body of data.

38. A method in a computer system for retrieving and using a body of data subject to user input, the method comprising the steps of:
   receiving a request to retrieve and use an identified body of data;
   initiating retrieval of the identified body of data;
   during the retrieval of the identified body of data, requesting additional user input while retrieval of the identified body of data proceeds; and when the additional user input is provided, using the identified body of data in accordance with the received request.

39. A computer-readable medium whose contents cause a computer system to retrieve and use a body of data subject to user input by performing the steps of:

receiving a request to retrieve and use an identified body of data;

initiating retrieval of the identified body of data;

during the retrieval of the identified body of data, requesting user input while retrieval of the identified body of data proceeds; and when the user input is received, using the identified body of data in accordance with the received request.

40. An apparatus for retrieving and using a body of data, comprising:

a request receiver that receives a request to retrieve and use an identified body of data;

a retrieval subsystem that initiates retrieval of the identified body of data;

a data use discriminator that automatically rejects the use of the identified body of data during the retrieval of the identified body of data;

a user interface subsystem that provides a user interface for authorizing the use of the identified body of data in response to the rejection of the use of the identified body of data by the data use discriminator, while retrieval of the identified body of data under the control of the retrieval subsystem proceeds; and a data use subsystem that uses the identified body of data in accordance with the received request when the provided user interface provided by the user interface subsystem is used to authorize the use of the identified body of data.

* * * * *